(12) United States Patent
Laurent-Chatenet et al.

(10) Patent No.: US 7,342,963 B2
(45) Date of Patent: Mar. 11, 2008

(54) METHOD FOR CALCULATING AN IMAGE INTERPOLATED BETWEEN TWO IMAGES OF A VIDEO SEQUENCE

(75) Inventors: Nathalie Laurent-Chatenet, Vignoc (FR); Alexandre Buisson, Rennes (FR)

(73) Assignee: France Telecom, Paris (FR)

( * ) Notice: Subject to any disclaimer, the term of this patent is extended or adjusted under 35 U.S.C. 154(b) by 810 days.

(21) Appl. No.: 10/362,046

(22) PCT Filed: Aug. 7, 2001

(86) PCT No.: PCT/FR01/02570

§ 371 (c)(1),
(2), (4) Date: Jun. 11, 2003

(87) PCT Pub. No.: WO02/17645

PCT Pub. Date: Feb. 28, 2002

(65) Prior Publication Data

US 2004/0037471 A1   Feb. 26, 2004

(30) Foreign Application Priority Data

Aug. 24, 2000 (FR) .................. 00 10917

(51) Int. Cl.
*H04N 7/12* (2006.01)
(52) U.S. Cl. ............ 375/240.16; 375/240; 375/240.01; 375/240.12
(58) Field of Classification Search ........... 375/240, 375/240.01, 240.04, 240.12, 240.16; 345/420; 382/107
See application file for complete search history.

(56) References Cited

U.S. PATENT DOCUMENTS

| 4,383,272 A |   | 5/1983 | Netravali et al. ........... 358/136 |
| 5,132,792 A | * | 7/1992 | Yonemitsu et al. ..... 375/240.16 |
| 6,252,974 B1 | * | 6/2001 | Martens et al. ............. 382/107 |
| 6,614,428 B1 | * | 9/2003 | Lengyel ..................... 345/420 |

FOREIGN PATENT DOCUMENTS

| EP | 0 753 970 | 1/1997 |
| EP | 0 883 300 | 12/1998 |
| GB | 2 279 531 | 1/1995 |

OTHER PUBLICATIONS

"Hybrid object-based/block-based coding in video compression at very low bit-rate", C. Chu et al., Signal Processing: Image Communication, Elsevier Science Publishers, Jul. 1, 1997, pp. 159-171.

(Continued)

*Primary Examiner*—Allen Wong
(74) *Attorney, Agent, or Firm*—Westman, Champlin & Kelly

(57) ABSTRACT

The invention concerns a method for constructing at least an image interpolated between a preceding image and a following image of an animated sequence. The invention is characterised in that the method takes into account data concerning the presence of at least an occlusion zone in said preceding image and/or in said following image, called occlusion data.

16 Claims, 6 Drawing Sheets

OTHER PUBLICATIONS

"Triangular active mesh for motion estimation", M. Dudon et al., Signal Processing: Image Communication, Elsevier Science Publishers, Jul. 1, 1997, pp. 21-41.

"Scalable Image Coding with Fine Granularity Based on Hierarchical Mesh", P. Lechat et al., Proceedings of the SPIE, Jan. 1999, pp. 1130-1142.

"Coding for the storage and communication of visualisations of 3D medical data", D. Tzovaras et al., Signal Processing: Image Communication, Elsevier Science Publishers, Jul. 1, 1998, pp. 65-87.

* cited by examiner

METHOD FOR CALCULATING AN IMAGE INTERPOLATED BETWEEN TWO IMAGES OF A VIDEO SEQUENCE

CROSS-REFERENCE TO RELATED APPLICATION

This Application is a Section 371 National Stage Application of International Application No. PCT/FR01/02570 filed Aug. 7, 2001 and published as WO 02/17645 on Feb. 28, 2002, not in English.

FIELD OF THE INVENTION

The field of the invention is that of the encoding and/or decoding of moving image sequences. More specifically, the invention relates to the constructing of one or more image(s) interpolated between two given images of a moving sequence.

BACKGROUND OF THE INVENTION

The invention can be applied in all fields of imaging and image processing. The following can be mentioned as non-restrictive examples:
  video encoding and/or decoding especially in order to improve the performance of an MPEG-4 or H263+ type encoder/decoder or any other video encoder/decoder;
  medical imaging;
  the conversion of standards, such as the PAL/NTSC conversion for example.

The invention can be applied especially, but not exclusively, to the temporal interpolation of frames and/or to the bi-directional encoding of video sequences, with a view especially to overcoming the problems of bandwidth saturation and adaptability to terminals of varied types.

Indeed, it is now one of the main goals of operators in the video field to enable a user to view moving sequences of satisfactory quality, especially sequences in which the successive images follow one another in a fluid manner. Now, the problem of the fluidity of the video sequences is highly dependent on that of the saturation of the transmission networks and of the capacity (especially the storage capacity) of the display terminals available to the user.

In order to meet the requests of the users, and overcome the problems of bandwidth saturation, it is therefore necessary to produce video streams in a wide range of bit rates. However, the video sequences transmitted at low or medium bit rates generally appear to be jerky when they are viewed.

The method envisaged therefore was to implement a frame frequency interpolation during the decoding of the bit streams transmitted, and/or a storage of additional information during the encoding in bi-directional mode, in order to generate video sequences of greater fluidity, as a function of the display terminal, the transmission network and/or a request from a user.

Various techniques of frequency interpolation, relying on the estimation of a motion field, have been envisaged but, to date, none of them performs satisfactorily.

It may be recalled that the motion between two images of the sequence can be defined as a 2D vector characterizing the difference of positions between a pixel of one image and the homologous pixel in the other image, it being assumed that these pixels correspond to the same physical point in each of the two images. The assignment of a displacement vector to each pixel in the image therefore defines a dense motion field in the image. This motion field is also called an optical flow.

The methods of motion field estimation used for the interpolation of frame frequency are of two types:
  enumerative methods, also called matching methods;
  differential methods.

The enumerative methods rely on the subdivision of the domain of an image into finite-sized regions by regular or matched partitioning. Then, a motion model is defined. This model may be, for example, affine, translational, polynomial, etc. and the procedure involves successive iterations in which a set of distinct values, included in a predetermined interval, is applied to the parameters of this model.

The differential methods, for their part, consist in estimating a dense motion field by assigning a motion vector to each pixel of the image considered. They implement, firstly, methods of differential computation and, secondly, optimization techniques relying for example on gradient descents. These methods include especially methods based on the equation of the optical flow, pel-recursive methods (pel standing for "Physical Picture Element"), parametric methods or robust estimators for example.

Much research work has been undertaken in order to improve existing techniques of image interpolation. Of this work, reference may be made to the method proposed by Ciro CAFFORIO and Fabio ROCCA ("Motion Compensation Image Interpolation", IEEE Transactions on communications, Vol. 38, 2, February 90), consisting of the use of a pel-recursive estimator for motion compensation.

It may be recalled that pel-recursive methods proceed by prediction-correction of the motion vectors associated with each of the chosen pixels of an image, in a predetermined path direction. The prediction may rely on the value of the motion vector of the previous pixel, or on a linear combination of the motion vectors of the pixels neighboring the pixel considered. The correction is then based on a minimization of the DFD (Displacement Frame Difference) by a method of gradient descent.

One drawback of this prior art technique is that the algorithm implemented by CAFFORIO and ROCCA suffers from high interaction between the recursive directions and the direction of the displacement to be estimated.

To overcome this effect, the use of four distinct recursive directions was envisaged. Thus, the disturbing effects were minimized. However, the performance of this technique remains inadequate.

Jack NIEWEGLOWSKI (in "Motion Compensated Video Interpolation Using Digital Image Warping", IEEE ICASSP'94) has proposed a method relying on the use of a geometrical conversion, combined with an improved technique known as "block matching".

A method of this kind can be used to take account of changes in scale but has the drawback of low robustness owing to the decorrelation between geometrical transformation and block matching.

Q. WANG and L. J. CLARK ("Motion Estimation and Compensation for Image Sequence Coding", Signal Processing: Image Communication, Vol. 4, No. 2, April 92, pp. 161-174) subsequently envisaged the implementation of a parametrical algorithm, relying on the modeling of the motion of any region of an image by an a priori defined model.

One drawback of this prior art technique is that it is not suited to the estimation of the regions of heavy motion.

To overcome the different problems encountered by these motion estimation techniques, it has also been proposed to implement algorithms for the estimation of hierarchical motion, such as those described by L. Böröcsky and P. Csillag ("Multiresolution Motion Field Estimation for Wavelet Video Coding and Frame Interpolation", Final Workshop, Vigo, Spain, October 94, pp. 163-166).

Hierarchical motion estimation algorithms of this kind, like the prior art motion estimation methods described here above, come up against the problem of the detection of the occlusion zones (zones of crowding, concealment or uncovering of the mesh) within the images of the video sequence considered. Indeed, when different planes and objects overlap in a scene, zones of occlusion appear, generating lines of discontinuity within the mesh associated with the image.

The technique most commonly used to manage the appearance and/or the disappearance of occlusion zones within an image is the use of raytracing. Such a technique consists of the association, with each of the constituent pixels of the image, of a label pertaining to the motion vector associated with this pixel.

Thus a pixel receiving at least two motion vectors carries the label "occlusion", which means that it covers at least two pixels present in the preceding image of the sequence. A pixel receiving a single motion vector carries the label "normal", thus indicating that it is present in the preceding image and in the current image. Finally, a pixel receiving no motion vector carries the label "gap", so as to indicate that it belongs to an uncovering zone of the image.

This kind of technique is described especially in J. Ribas-Corbera and J. Sklansky, "Interframe Interpolation of Cinematic Sequences", Journal of Visual Communication and Image Representation, Vol. 4, No. 4, December 93, pp. 392-406 and in B. Chupeau and P. Salmon "Motion Compensating Interpolation for Improved Slow Motion", Thomson-CSF/Laboratoires electroniques de Rennes, France.

However, this prior art technique exploits this label information only to make an a posteriori correction of the interpolated images, but does not take account of them during the motion estimation enabling the constructing of such images.

The invention is aimed especially at overcoming these drawbacks of the prior art.

More specifically, it is a goal of the invention to provide a technique for the constructing of an image interpolated between a preceding image and a following image in a moving sequence, to improve the impression of fluidity during the display of the sequence.

Another goal of the invention is to implement a technique for the constructing of an interpolated image that is simple and cost little to implement.

Yet another goal of the invention is to provide a technique for the constructing of an interpolated image that is robust and adapted to the regions of heavy motion.

It is also a goal of the invention to implement a technique for the constructing of an image interpolated within a video sequence enabling the management of the appearance and/or the disappearance of objects that correspond to occlusion zones (reversal zones, uncovering zones, crowding zones) within a mesh associated with the images of the sequence.

It is yet another goal of the invention to provide a technique for the constructing of an interpolated image, enabling a user with a terminal of limited storage capacity to view a fluid video sequence.

It is yet another goal of the invention to implement a technique for the constructing of an interpolated image, enabling a user to view a fluid video sequence, despite a saturation of the bandwidth of the network by which it is transmitted.

It is also a goal of the invention to provide a technique for the constructing of an interpolated image that can be integrated into any video encoder/decoder in order to improve its performance, especially in terms of visual fluidity.

BRIEF SUMMARY OF THE INVENTION

These goals as well as others that shall appear here below are achieved by means of a method for constructing at least one image interpolated between a preceding image and a following image of a moving sequence.

According to the invention, a method of this kind takes account of information, pertaining to the presence of at least one occlusion zone in said preceding image and/or in said following image, known as occlusion information.

Thus, the invention relies on a wholly novel and inventive approach to the interpolation of images within a moving sequence. Indeed, the invention relies especially on the management of occlusion zones (namely reversal or uncovering zones) that appear within a mesh associated with an image of the sequence.

The invention therefore makes it possible to substantially improve the visual fluidity of a moving sequence, by implementing a generation of intermediate images interposed between two given images of the sequence, and by toning down the artifacts and the lines of discontinuity introduced by the existence of one or more occlusion zones within such images.

Advantageously, an image of said sequence is associated with a mesh.

Indeed, the mesh increasingly constitutes the medium of representation of the objects, especially in a virtual reality scene. Thus they represent the major part of the quantity of information describing a scene of this kind. Conventionally, a mesh is defined by a set of vertices and faces (or a set of vertices, edges and orientations) defining a topology.

A mesh of this kind may be, for example, a flat mesh, or any other type of mesh enabling a motion estimation to be carried out from the image with which it is associated.

According to an advantageous characteristic of the invention, said mesh is a hierarchical mesh having at least two nested mesh levels within a mesh pyramid.

Thus, referring to the example of FIG. 1, the use of a nested hierarchical mesh 11 makes it possible to obtain robust encoding, and reduces the cost of transmission and/or storage of information. Indeed, there is a high correlation between the information carried by a parent node and the information carried by its daughter nodes within the mesh. Consequently, the values of the nodes 12, 13 belonging to the highest levels of the mesh pyramid (corresponding to a rough mesh of the image) are quantified with a view to their transmission, for example toward an encoder, and/or their storage in a data carrier 15. By contrast, for the lower levels of the mesh pyramid (corresponding to a finer mesh of the image), only the differential values of the daughter nodes 14 are quantified with a view to their transmission and/or their storage, as illustrated in FIG. 1.

According to an advantageous technique, said occlusion information is determined by the implementation of a step for the forward and/or backward estimation of motion between said preceding and following images.

The implementation of a forward motion estimation step consists in determining a set of motion vectors associated with the vertices of a mesh representing a first image at an instant $t_1$, and enabling the constructing of a mesh associated with a second image at a subsequent instant $t_2$. Such a step makes it possible especially to detect the at least partial disappearance of an object between the images at the instants $t_1$ and $t_2$.

Similarly, the implementation of earlier estimation step makes it possible to determine the motion vectors to be applied to the vertices of the mesh associated with the image at the instant $t_2$ to obtain the image at the previous instant $t_1$, and also enable the detection of the possible appearance of objects between the images at the instants $t_1$ and $t_2$.

It is therefore possible to envisage carrying out a forward estimation step, so as to detect a disappearance of objects if any, or a backward estimation step so as to detect an appearance of objects if any. The joint performance of a forward estimation step and a backward estimation step thus makes it possible to detect the presence of any zone of occlusion, corresponding to a reversal or an uncovering of meshes, associated with a disappearance or an appearance of objects.

Preferably, when there is at least one occlusion zone in said preceding image (or in said following image respectively), a method of this kind implements the following steps:

for each occlusion zone, a step of exclusion, in said preceding image (or said following image respectively), of a region of said mesh encompassing at least one mesh point corresponding to said occlusion zone, called an encompassing region, so as to obtain an approximate preceding image (or an approximate following image respectively);

a step of forward estimation (or backward estimation respectively), so as to determine motion vectors making it possible to obtain an approximate following image (or preceding image respectively) from said approximate preceding image (or following image respectively), called forward motion vectors (or backward motion vectors respectively);

a step for the constructing of an intermediate image from said approximate preceding image (or following image respectively) and said forward motion vectors (or backward motion vectors respectively).

Indeed, the presence of an occlusion zone may introduce error into the computation of the motion estimation between two given images of the sequence. An approximate image is therefore constructed. This image is obtained by the exclusion, from a given image, of at least one region of the mesh corresponding to at least one occlusion zone.

The method therefore consists in making a new estimation of the motion between the instants $t_1$ and $t_2$, after having excluded the defective zones (namely the zones containing at least one mesh reversal), in order to minimize the prediction error between the two images corresponding to the instants $t_1$ and $t_2$ considered.

This new estimation, made from the approximate image, is used to determine the optimum motion vectors for the continuous zone of the image (namely assuming a one-to-one correspondence between $t_1$ and $t_2$) and thus preventing the values of the motion vectors obtained during the motion estimation from being disturbed by the existence of zones of discontinuities.

According to an advantageous characteristic of the invention, said encompassing region is a disk of radius k (also called a k-disk) with respect to said occlusion zone where $k \geq 1$.

We may recall the definition of a disk of radius k with respect to the occlusion zone: A disk of radius 1 of an occlusion zone is the occlusion zone itself; for any value of k>1, the disk of radius k of an occlusion zone corresponds to a region that contains the occlusion zone and has its boundary located at a maximum distance of k−1 edges from the border of the occlusion zone considered.

Preferably, said constructing step consists of the application, of said forward motion vectors (or backward motion vectors respectively), weighted by a scalar value of less than 1, to said approximate preceding image (or following image respectively).

Indeed, the step for the forward and/or backward estimation of motion makes it possible to determine all the motion vectors used to pass from the preceding image to the following image. Depending on the temporal position of the intermediate image to be constructed between the preceding and following images, these vectors are weighted with a scalar value ranging from 0 to 1.

According to a first advantageous alternative embodiment of the invention, a method of this type comprises a step for the reconstruction of a mesh associated with said intermediate image consisting, for each occlusion zone, of the implementation of the step for determining calorimetric and/or photometric information associated with a part of said mesh corresponding to said encompassing region, so as to obtain said interpolated image.

Thus, an interpolated image is reconstructed from the previously obtained intermediate image, by determining luminance and/or chrominance information associated with the encompassing region.

A determining step of this kind may be implemented according to the approach proposed in the, "Procédé de codage d'images fixes ou animées avec réduction et adaptation du débit" ("Method for the encoding of still or moving images with reduction and adaptation of the bit rate").

The object of this patent document is a method for the encoding of a digital image, aimed at producing a bit stream representing this image, the length of the bit stream being a function of the desired representation. This method comprises the following steps:

the definition, on a domain of the image to be encoded, of a hierarchical mesh comprising a plurality of nested meshes whose mesh point vertices may be pixels of said image;

the optimization of luminance, chrominance, and positions on each mesh level;

the determining, for each mesh point of said hierarchical mesh, of a difference of luminance between the image to be encoded and an interpolated image obtained from the vertices of the nested mesh to which the mesh point considered belongs, and the introduction, into the bit stream, of the values (advantageously encoded differentially with respect to the previous hierarchical level) of positions, luminance and chrominance of the vertices of the mesh points for which the difference in luminance is greater than a threshold difference According to this technique, at the end of the mesh step, a quaternary tree structure is constructed. This tree structure, associated with the hierarchical mesh, is constructed in order to manipulate the values (colors and positions) of the vertices of the mesh points. The tree has a number of nodes equal to the number of triangles in the corresponding mesh level. Each node of the tree relates to only one triangle of the hierarchical mesh.

Once this tree is constructed, data of the tree are selected for introduction into the bit stream representing the image which will be transmitted and/or stored. This selection depends on the quality desired.

To make the selection, for each triangle, a difference in luminance is computed between the image to be encoded and the interpolated image from vertices of the nested mesh to which the mesh point considered belongs. This difference is then compared with a threshold difference for each triangle. The value of the threshold difference is a function of the desired quality of representation.

Then, the part of the tree relating to the triangles whose difference in luminance is greater than the threshold difference is introduced into the bit stream. This makes it possible to transmit the data pertaining to the image as a function of the local quality of these different triangular partitions.

Advantageously, this determining step implements, firstly, an encoding model using finite elements and, secondly, an alternative encoding model.

Indeed, when a hierarchical encoding is implemented, for example an encoding of the kind described in the French patent application FR 98 12525, and when a portion of the image is highly textured, it is then necessary to provide for a large number of mesh levels to obtain photometric and/or calorimetric information of adequate quality. In this case, the efficiency of the hierarchical encoding is low. In other words, the hierarchical encoding is well adapted to relatively smooth images, but not to images having highly textured parts.

A novel approach was therefore envisaged. This approach was described, for example, in the French patent application FR 99 06815 "Procédé de codage hiérarchique et mise en œuvre sélective d'un codage à base de transformation réversible, et procédé de décodage correspondant" (Method of hierarchical encoding and selective implementation of an encoding based on reversible transformation, and corresponding decoding method). Such a method for encoding an image to be encoded comprises the following steps:

the defining of a hierarchical mesh with at least two nested mesh levels formed by mesh points defined by the vertices (which may be pixels of said image to be encoded);

the determining, for each of said mesh points, of a piece of information of error between said image to be encoded and an interpolated image obtained from vertices of the mesh points belonging to the mesh level of the mesh point considered;

the stopping of the refining of the mesh points that have a piece of error information below a first predetermined threshold;

the implementation of a specific encoding for the mesh points having a piece of error information higher than a second predetermined threshold;

the continuation of the refining of the mesh points having a piece of error information higher than said predetermined threshold and below said second predetermined threshold.

Thus, according to this method, which proves to be particularly advantageous in the context of the invention, two distinct encoding modes are used selectively. Hierarchical encoding, or nested-mesh encoding, is the main encoding, or basic encoding, but it is not used systematically: for the image portions that necessitate it, another more efficient encoding is used.

The decision to use this specific encoding is taken by comparison with a threshold. More specifically, at each node considered of the tree representing the hierarchical mesh, three possibilities are offered: stopping the refining, or the division, of the mesh points (the quality attained for the corresponding image portion or the corresponding encompassing region being sufficient), passing to the next hierarchical level, in preserving the same hierarchical encoding, or using another encoding (especially an encoding better suited to the highly textured portions).

It will be noted that it is possible to envisage the use of several different types of specific forms of encoding (or one and the same encoding with different parameters), to adapt the choice of the encoding even more precisely to the characteristics of the image portion or portion of encompassing region.

According to a second advantageous alternative embodiment of the invention, a method of this kind comprises a step for the reconstruction of a mesh associated with said intermediate image consisting, for each occlusion zone, of the insertion in said mesh of a part of a mesh associated with said following image or with said preceding image corresponding to said encompassing region, so as to obtain said interpolated image.

Then, in the intermediate image, the contents of the occlusion zones are replaced by the corresponding zones of the preceding or following image. The interpolated image thus obtained is then constituted by a part obtained by interpolation, and corresponding to the displacement of the mesh associated with the preceding image (and following image respectively), and the occlusion zones containing information on the following image or preceding image.

According to an advantageous characteristic, a method of this kind furthermore comprises, for each occlusion zone, a step for the estimation of local motion between said interpolated image and a corresponding exact image, consisting in optimizing the position of at least one node of a part of said mesh corresponding to said encompassing region in said interpolated image, so as to generate a first improved interpolated image.

At the encoding level, motion of this kind is taken into account and encoded only if the motion estimation determines the absence of zones of discontinuity, and especially the absence of mesh reversal, between the interpolated image and the corresponding exact image.

Advantageously, a step of this kind furthermore comprises a step to compute an error image so as to assess an error between said improved first interpolated image and said corresponding exact image.

Thus, with the motion estimation between the interpolated image and corresponding exact image having determined the presence of occlusion zones, an error computation is implemented.

According to an advantageous technique, said error being greater than a predetermined threshold for at least one region of said error image, a method of this kind implements a step for determining colorimetric and/or photometric information associated with each of said regions so as to generate a second improved interpolated image.

Advantageously, said determining step implements, firstly, a model of encoding by finite elements and, secondly, an alternative encoding model.

As described further above, a determining step of this kind can be implemented according to the technique explained in the French patent application FR 99 06815 "Procédé de codage hiérarchique et mise en œuvre sélective d'un codage à base de transformation réversible, et procédé de décodage correspondant" (Method of hierarchical encoding and selective implementation of an encoding based on reversible transformation, and corresponding decoding method).

According to an advantageous characteristic of the invention, said determining step is implemented from said error image or said corresponding exact image, as a function of a predetermined cost criterion.

Indeed, prior to the implementation of the step for determining colorimetric and/or photometric information, the cost of such a step is estimated, firstly, from the error image and, secondly, from the exact image corresponding to the interpolated image. The least costly solution is then preferred.

Preferably, said mesh has a size greater than said image that it represents.

A technique of this kind is described, for example, in the French patent application No. FR 00 09273 dated Jul. 13, 2000, entitled "Estimateur de mouvement pour le codage et le décodage de séquences d'images" (Motion estimator for the encoding and decoding of image sequences), filed on behalf of the present Applicants. According to the technique explained in this patent application, by using a mesh having a size greater than the image with which it is associated, it is possible to implement a technique of motion estimation and compensation for the encoding and decoding of image sequences, enabling the management of the uncovering and crowding of meshes during the movement of objects.

The use of a mesh with the size greater than the size of the image makes it possible, according to the present invention, to improve the temporal interpolation of frames at the time of decoding.

The invention also relates to a method for encoding and a method for decoding a moving sequence, of the type implementing a step for the interpolation of at least one image interpolated between a preceding image and a following image.

In encoding and decoding methods of this kind, said interpolation step takes account of information on the presence of at least one occlusion zone in said preceding image and/or in said following image, called occlusion information.

The invention also relates to a terminal for the display of a moving sequence of images of the type comprising means for the interpolation of at least one interpolated image between a preceding image and a following image, said interpolation means taking account of the presence of at least one occlusion zone in said preceding image and/or in said following image.

The invention also relates to a video signal and a data carrier comprising information enabling the reconstructing of at least one image interpolated between a preceding image and following image of a moving sequence of images, said information taking account of the presence of at least one occlusion zone in said preceding image and/or in said following image.

BRIEF DESCRIPTION OF THE DRAWINGS

Other features and advantages of the invention shall appear more clearly from the following description of a preferred embodiment, given by way of a simple, non-restrictive and illustrative example, and from the appended drawings, of which.

DETAILED DESCRIPTION OF PREFERRED EMBODIMENTS

The general principle of the invention relies on the management of the occlusion regions during the constructing of the interpolated images within a moving sequence, for the purpose of bi-directional encoding and/or a temporal interpolation of frames during decoding.

Figure 2:
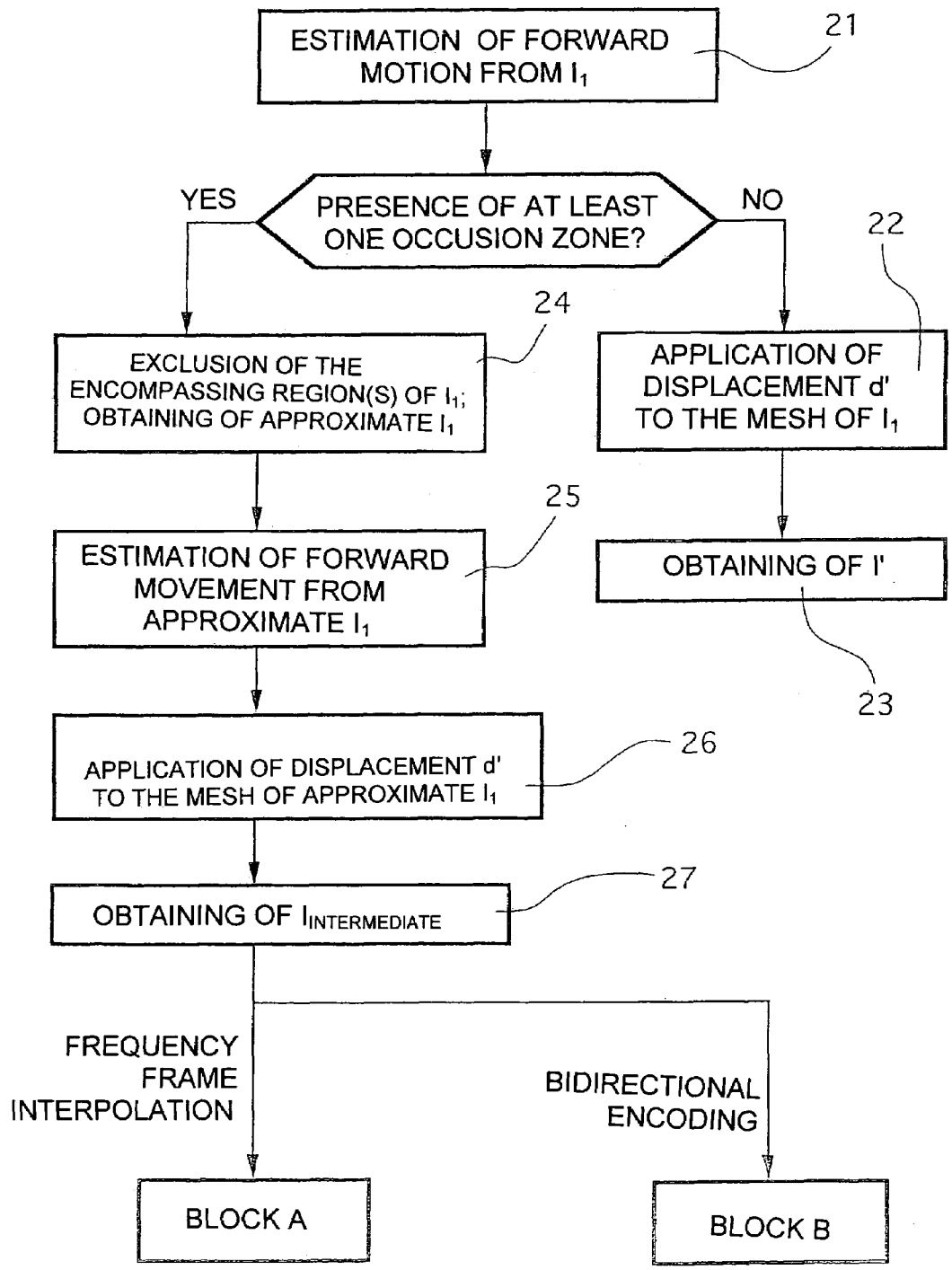
FIG. 2 shows a block diagram of all the steps implemented according to the invention to construct an interpolated image between a preceding image and following image in a moving sequence.
Figure 2A:
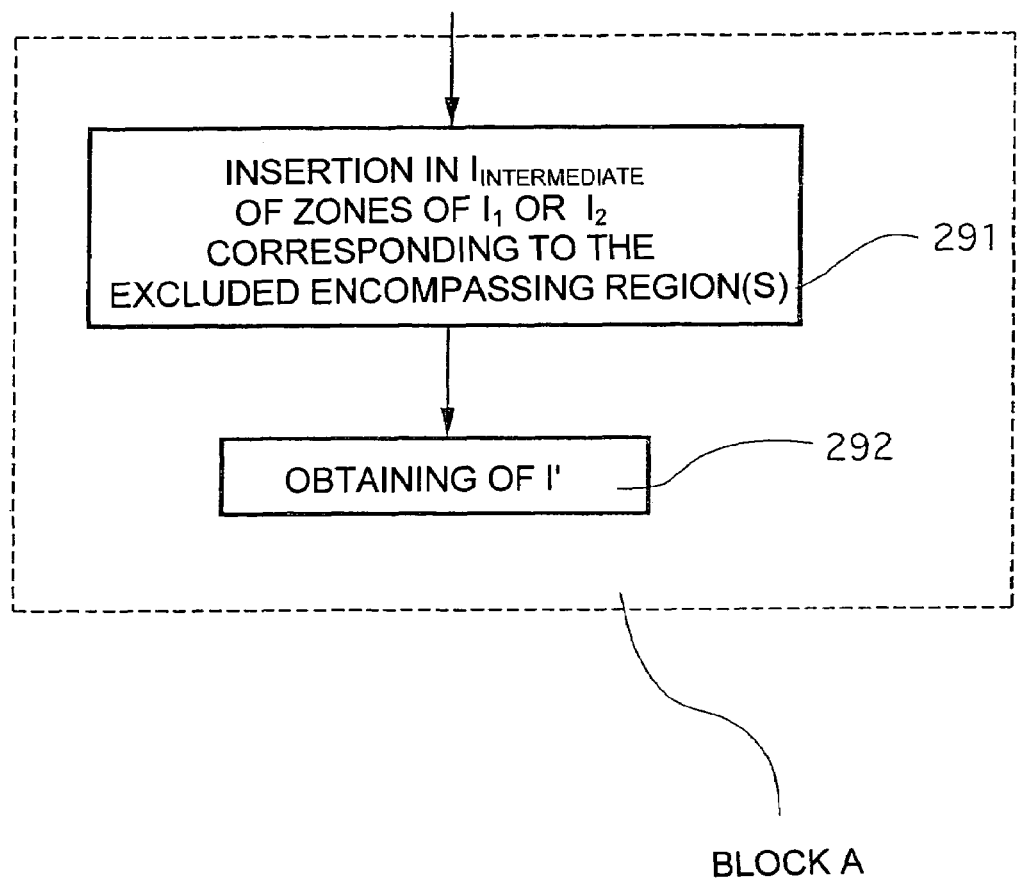
Figure 2B:
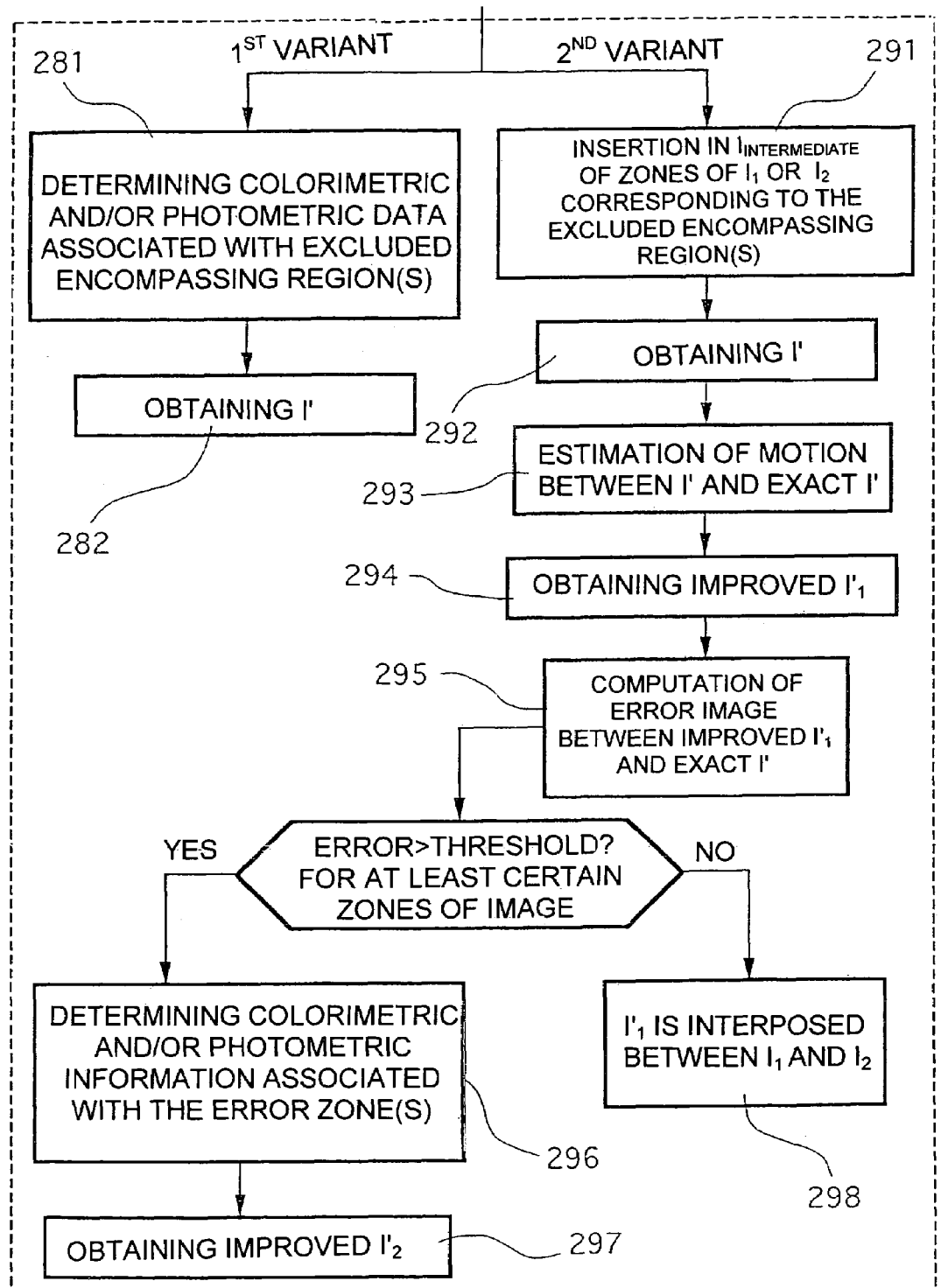

Referring now to FIG. 2, we present an embodiment of the constructing of an image interpolated between a preceding image and a following image of a moving sequence, in the form of a block diagram presenting all the steps to be implemented according to the invention.

Two images of a moving sequence are considered. They are respectively called $I_1$ and $I_2$, at two successive instants $t_1$ and $t_2$. It is sought to construct an interpolated image I' between $I_1$ and $I_2$, at an intermediate instant t' between $t_1$ and $t_2$.

Figure 1:
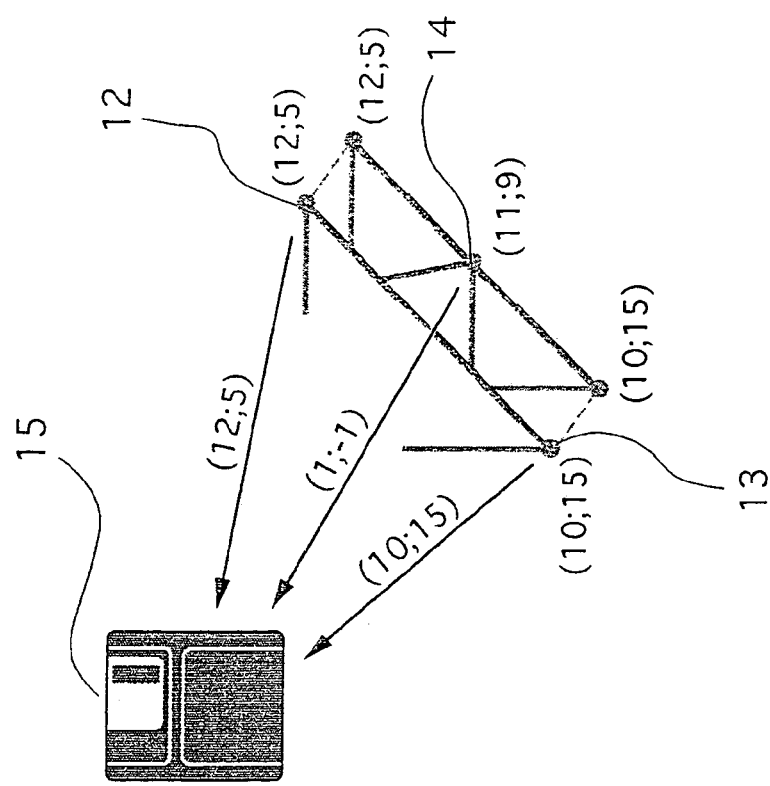
FIG. 1, described here above, shows an exemplary implementation of a nested triangular hierarchical mesh.
Figure 1:
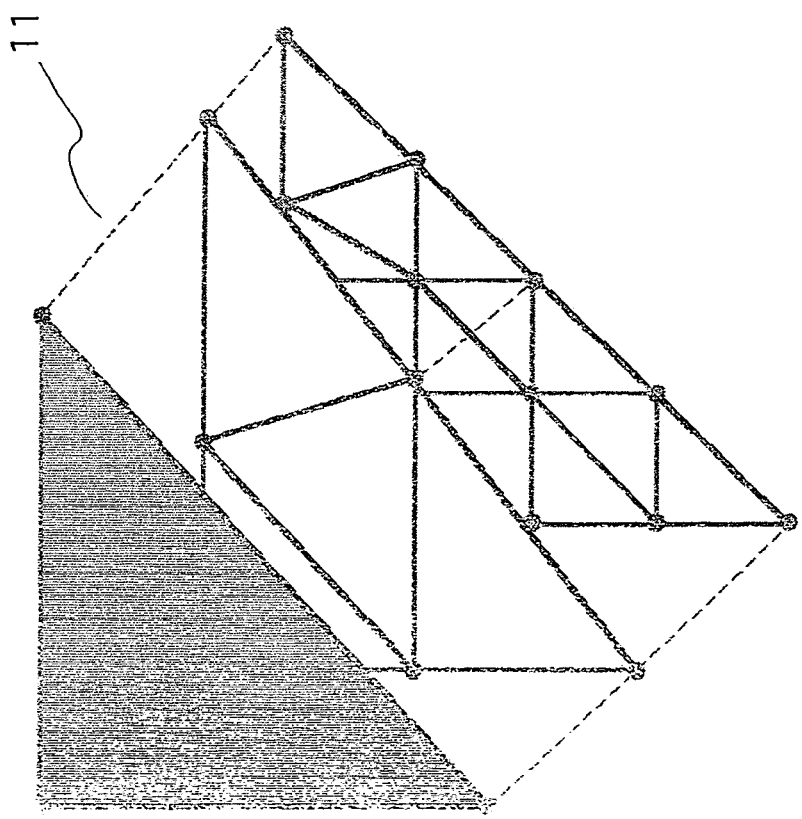

In a step referenced 21, a forward estimation of motion is made from the image $I_1$ so as to determine the motion vectors to be applied to the peaks of the mesh (for example a hierarchical mesh as shown in FIG. 1) associated with $I_1$ to obtain the image $I_2$. A step 21 of this kind may consist, of course, in making a backward estimation of motion from $I_2$ but, for the sake of reading simplicity, we shall strive to describe only an embodiment that implements a forward estimation step during the step referenced 21.

A step of this kind, referenced 21, enables the detection of the presence of possible crowding zones, herein corresponding to the at least partial disappearance of one or more objects in the image $I_1$. It also makes it possible to determine the motion d to be applied to the mesh associated with $I_1$ to obtain $I_2$.

When there are no crowding regions, a displacement d' is applied to the mesh associated with $I_1$ during a step referenced 22. This displacement d' is defined as follows:

$$d' = d \times \left( \frac{t_2 - t'}{t_2 - t_1} \right)$$

The displacement d, to be applied to the mesh associated with $I_1$ in order to obtain $I_2$ is thus weighted by a scalar value ranging from 0 to 1. This scalar value depends on the position of the image I' relative to the images $I_1$ and $I_2$. Thus, if it is desired to obtain an interpolated image close to the image $I_1$, the displacement d is weighted by a scalar value close to 0. If, on the other hand, it is desired to obtain an interpolated image temporally close to $I_2$, the displacement d is weighted by a scalar value close to 1.

At the end of the step referenced 22, the desired, interpolated image I' is obtained during a step referenced 23.

If, during the step referenced 21, the presence of at least one crowding zone is detected then, in a step referenced 24, the encompassing regions corresponding to the detected crowding zones are excluded from $I_1$ in such a way as to prevent an error of motion estimation that would be introduced by the presence of this occlusion zone or zones. Thus, an approximate image $I_1$ is obtained. This image corresponds to the image $I_1$ from which at least one occlusion zone has been excluded.

Then, during a step referenced 25, a forward motion estimation is carried out from the approximate value of $I_1$ in order to determine the optimum motion vectors for the continuous zone of the image (namely the vectors accepting one-to-one correspondence between $t_1$ and $t_2$).

Figure 3:
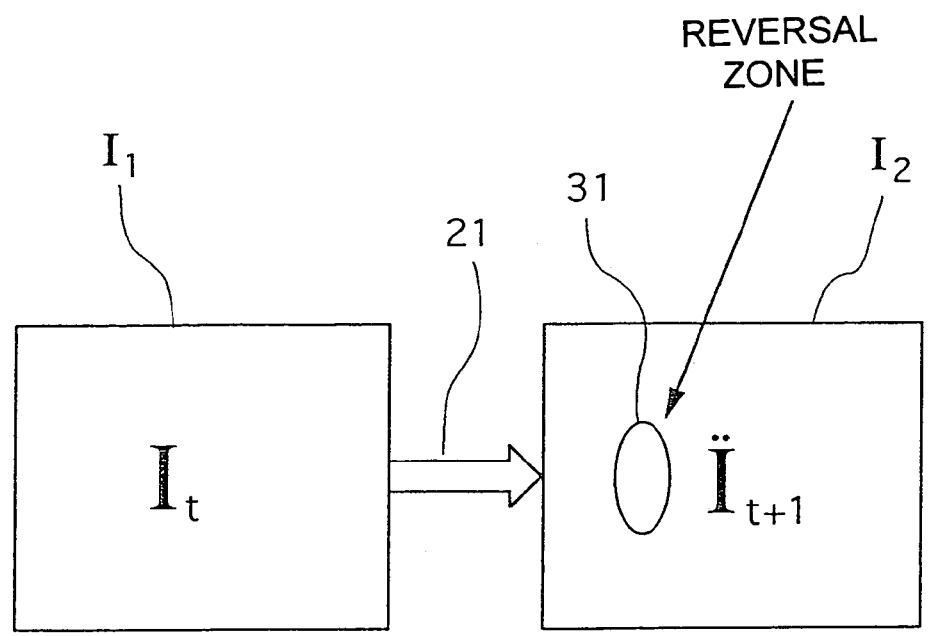
FIG. 3 shows a more detailed illustration of the steps 11, 14 and 15, shown in FIG. 2.
Figure 3:
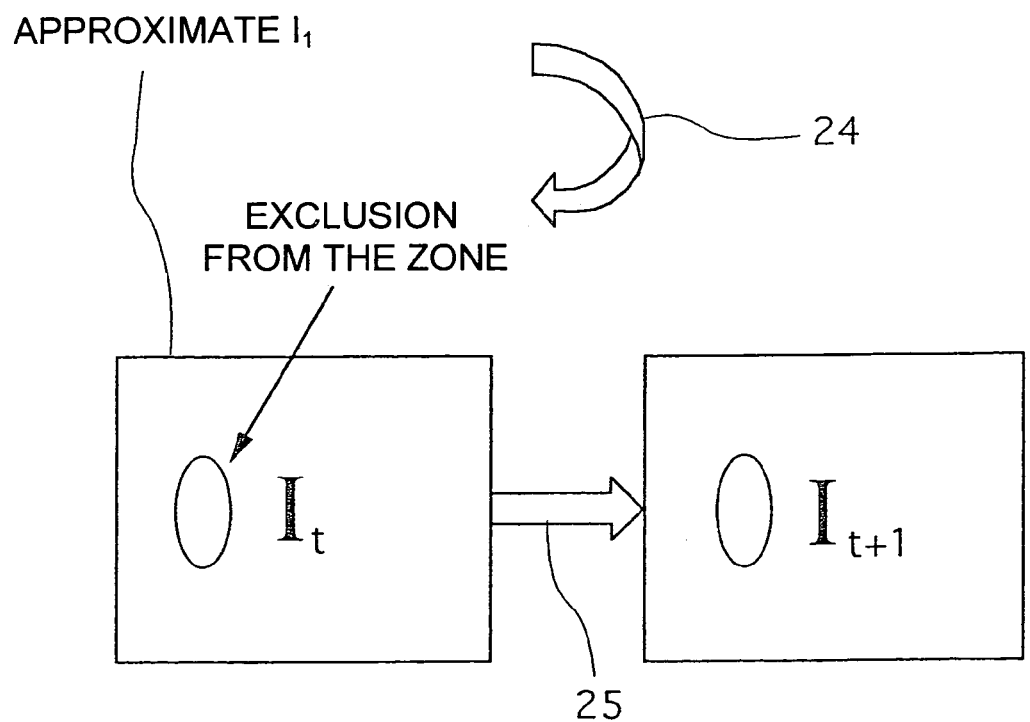

The steps 21, 24 and 25 are now described in greater detail with reference to FIG. 3.

During the step referenced 21 for the forward estimation of motion from the image $I_1$, the presence of a reversal zone 31 is detected. During the step referenced 24, the reversal zone 31 is thus excluded from $I_1$, so as to obtain an approximate image $I_1$. Thus, a forward motion estimation 25 is made from the approximate image $I_1$ so as to obtain the optimum motion vectors to be applied to the vertices of the mesh associated with $I_1$ to obtain $I_2$.

During a step referenced 26, a displacement d' is applied to the mesh associated with the approximate image $I_1$ so that, in an intermediate step 27, an intermediate step $I_{intermediate}$ is obtained. A displacement d' of this kind is obtained by the weighting of the optimum displacement d, determined during the step referenced 25, by a scalar value ranging from 0 to 1. This is done by a technique similar to the one implemented during the step referenced 22.

Should the invention apply to the interpolation of the frame frequency, a step referenced 291 is implemented. This step consists of the insertion, in $I_{intermediate}$, of the zone or zones of $I_2$ or $I_1$ corresponding to the encompassing region or regions excluded from $I_1$ during the step referenced 24. Thus, the contents of the crowding zones are replaced by the corresponding zones of the instant $t_2$ or of the instant $t_1$.

Thus, during a step referenced 292, an image I' is obtained. This image is constituted, firstly, by an interpolated part corresponding to the displacement d' of the mesh associated with $I_1$, and secondly the displacement of the zone or zones, corresponding to the occlusion zone or zones, and containing information on the image $I_2$ or the image $I_1$.

Should the invention be applied to bi-directional encoding, it is possible to envisage two alternative embodiments enabling the interpolated image I' to be obtained from $I_{intermediate}$.

A first embodiment consists of the determining, during a step referenced 281, of the colorimetric and/or photometric information associated with the region or regions of $I_{intermediate}$ corresponding to the encompassing region or regions excluded from $I_1$ during the step referenced 24. Thus the totality of the mesh associated with $I_{intermediate}$ is rebuilt so as to obtain an interpolated image I' during a step referenced 282. A step 281 of this kind can be implemented, for example, according to the technique described in the patent document FR-98 12525 "Procédé de codage d'images fixes ou animées avec réduction et adaptation du debit" (Method for the encoding of still or moving images with reduction and adaptation of the bit rate).

A second alternative embodiment consists of the insertion in $I_{intermediate}$, during a step referenced 291, of the zones of $I_2$ or $I_1$ corresponding to one or more encompassing zones excluded from $I_1$ during the step referenced 24. Thus, the contents of the crowding zones are replaced by the corresponding zones of the instant $t_2$ or of the instant $t_1$.

In general, the image I' is obtained by insertion of the contents of the image $I_2$ when carrying out a forward estimation and by insertion of the contents of the image $I_1$ when carrying out a backward motion estimation, in order to enable a total overlapping of the interpolated image I'. However, in certain cases, it may be preferred to construct the image I' by insertion of the contents of the image $I_2$ (or $I_1$ respectively) when making a backward estimation (or forward estimation respectively), for example to obtain a better quality image I' and/or give greater visual fluidity to the video sequence.

Thus, an image I' is obtained in a step referenced 292. This image I' is constituted, firstly, by an interpolated part corresponding to the displacement d' associated with $I_1$, and secondly by the zone or zones, corresponding to the occlusion zones, and containing information on the image $I_2$ or the image $I_1$.

In order to obtain an improved approximation of the image I', a motion estimation 293 is made between I' and the corresponding exact interpolated image.

Thus, during a step referenced 294, a first improved interpolated image $I_1'$ is obtained. During a step 295, an error image is then computed, corresponding to the error between improved $I_1'$ and the corresponding exact interpolated image.

If the error is small (for example if it is below a predetermined error threshold), then the image $I'_1$ is interposed between the images $I_1$ and $I_2$ of the moving sequence during a step referenced 298.

If not, if the error is above a predetermined threshold for at least certain parts of the error image, then a step 296 is implemented for determining colorimetric and/or photometric information associated with the zone or zones of the image in which the error is great.

Again, a step 296 such as this may, for example, be implemented according to the technique described in the patent document FR-98 12525 entitled "Procédé de codage d'images fixes ou animées avec réduction et adaptation du debit" (Method for the encoding of still or moving images with reduction and adaptation of the bit rate).

Then, during the step referenced 297, there is obtained a second improved interpolated image $I_2'$ to be interposed between the images $I_1$ and $I_2$ of the sequence of images.

At the encoding level, the information needed by the encoder then corresponds to the motion vectors d*, corresponding to the motion estimation between I' and the corresponding exact image, and the chrominance and luminance information associated with the local error correction if necessary.

Figure 4:
FIG. 4 illustrates an exemplary application of the invention to the temporal interpolation of frames.

The improved interpolated image I', $I'_1$, or improved image $I'_2$ obtained at the end of one of the steps referenced 23, 282, 294 or 297 can then be interposed between two successive images of a moving sequence, as shown in FIG. 4.

Thus, at the decoding of the sequence 40 for example, the decoder constructs an interpolated image 43, possibly from information transmitted by the encoder, which it inserts between two images referenced 41 and 42, in order to increase the visual fluidity of the sequence 40.

The invention claimed is:

1. Method for constructing at least one interpolated image between a preceding image and a following image in a moving sequence of images, said images comprising at least two objects, wherein the method comprises the steps of:

detecting, in said preceding image and/or in said following image, at least one zone, called occlusion zone, corresponding to a zone where a first of said objects is at least partially overlapped by a second of said objects, and providing for a corresponding occlusion information defining said occlusion zone;

determining an approximate preceding image, respectively an approximate following image, in view of said occlusion information, by removing in said preceding image, respectively said following image, at least one region corresponding to one of said at least one occlusion zone;

applying motion estimation to the objects of said approximate preceding image and/or said approximate following image, to provide said at least one intermediate image, wherein each of said images is associated to a mesh and wherein said motion estimation is applied to said mesh, said motion estimation comprising the steps of:

excluding, for each occlusion zone in said preceding image or said following image respectively, a region of said mesh encompassing at least one mesh point corresponding to said occlusion zone, called an encompassing region, so as to obtain an approximate preceding image, or an approximate following image respectively;

determining motion vectors, called forward motion vectors or backward motion vectors respectively, using forward estimation or backward estimation respectively, enabling determination of said approximate following image or preceding image respectively, from said approximate preceding image or following image respectively;

constructing an intermediate image from said approximate preceding image, or approximate following image respectively, and said forward motion vectors or backward motion vectors respectively.

2. Method of construction according to claim 1, characterized in that said mesh is a hierarchical mesh having at least two nested mesh levels within a mesh pyramid.

3. Method of construction according to claim 1, wherein said step of determining an approximate image comprises a step of determining an encompassing region being a disk of radius k (k-disk) with respect to said occlusion zone, where $k \geq 1$.

4. Method of construction according to claim 1, characterized in that said constructing step comprises application of said forward motion vectors (or backward motion vectors respectively), weighted by a scalar value of less than 1, to said approximate preceding image (or following image respectively).

5. Method of construction according to claim 1, comprising a step of the reconstructing a mesh associated to said intermediate image comprising, for each of said at least one occlusion zone, a step of determining colorimetric and/or photometric pieces of information associated to a part of said mesh corresponding to said encompassing region, so as to provide said interpolated image.

6. Method of construction according to claim 5, characterized in that said determining step implements, firstly, an encoding model using finite elements and, secondly, an alternative encoding model.

7. Method of construction according to claim 1, wherein the method comprises a step for the reconstruction of a mesh associated with said intermediate image consisting, for each occlusion zone, of the insertion in said mesh of a part of a mesh associated with said following image or with said preceding image corresponding to said encompassing region, so as to obtain said interpolated image.

8. Method of construction according to claim 7, wherein the method furthermore comprises, for each occlusion zone, a step for the estimation of local motion between said interpolated image and a corresponding exact image, consisting in optimizing the position of at least one node of a part of said mesh corresponding to said encompassing region in said interpolated image, so as to generate a first improved interpolated image.

9. Method of construction according to claim 8, wherein the method furthermore comprises a step to compute an error image so as to assess an error between said improved first interpolated image and said corresponding exact image.

10. Method of construction according to claim 9, characterized in that, said error being greater than a predetermined threshold for at least one region of said error image, a method of this kind implements a step for determining colorimetric and/or photometric information associated with each of said regions so as to generate a second improved interpolated image.

11. Method of construction according to claim 10, characterized in that said determining step implements, firstly, a model of encoding by finite elements and, secondly, an alternative encoding model.

12. Method of construction according to claim 10, characterized in that said determining step is implemented from said error image or said corresponding exact image, as a function of a predetermined cost criterion.

13. Method of construction according to claim 1, characterized in that said mesh has a size greater than said image that it represents.

14. Method for the encoding of a moving sequence, of the type implementing a step for the interpolation of at least one interpolated image between a preceding image and a following image in the moving sequence, said images comprising as least two objects, wherein the method comprises:

detecting, in said preceding image and/or in said following image, at least one zone, called an occlusion zone, corresponding to a zone where a first of said objects is at least partially overlapped by a second of said objects, and providing for a corresponding occlusion information defining said occlusion zone;

determining an approximate preceding image, respectively an approximate following image, in view of said occlusion information, by removing in said preceding image, respectively said following image, at least one region corresponding to one of said at least one occlusion zone; and applying motion estimation to the objects of said approximate preceding image and/or said approximate following image, to provide at least one intermediate image, wherein each of said images is associated to a mesh and wherein said motion estimation is applied to said mesh, said motion estimation comprising the steps of:

excluding, for each occlusion zone in said preceding image or said following image respectively, a region of said mesh encompassing at least one mesh point corresponding to said occlusion zone, called an encompassing region, so as to obtain an approximate preceding image, or an approximate following image respectively;

determining motion vectors, called forward motion vectors or backward motion vectors respectively, using forward estimation or backward estimation respectively, enabling determination of said approximate following image or preceding image respectively, from said approximate preceding image or following image respectively; and constructing an intermediate image from said approximate preceding image, or approximate following image respectively, and said forward motion vectors or backward motion vectors respectively.

15. Method for the decoding of a moving sequence, of the type implementing a step for the interpolation of at least one interpolated image between a preceding image and a following image in the moving sequence, said images comprising as least two objects, wherein the method comprises:

detecting, in said preceding image and/or in said following image, at least one zone, called an occlusion zone, corresponding to a zone where a first of said objects is at least partially overlapped by a second of said objects, and providing for a corresponding occlusion information defining said occlusion zone;

determining an approximate preceding image, respectively an approximate following image, in view of said occlusion information, by removing in said preceding image, respectively said following image, at least one region corresponding to one of said at least one occlusion zone; and applying motion estimation to the objects of said approximate preceding image and/or said approximate following image, to provide at least one intermediate image, wherein each of said images is associated to a mesh and wherein said motion estimation is applied to said mesh, said motion estimation comprising the steps of:

excluding, for each occlusion zone in said preceding image or said following image respectively, a region of said mesh encompassing at least one mesh point corresponding to said occlusion zone, called an encompassing region, so as to obtain an approximate preceding image, or an approximate following image respectively;

determining motion vectors, called forward motion vectors or backward motion vectors respectively, using forward estimation or backward estimation respectively, enabling determination of said approximate following image or preceding image respectively, from said approximate preceding image or following image respectively; and constructing an intermediate image from said approximate preceding image, or approximate following image respectively, and said forward motion vectors or backward motion vectors respectively.

16. Terminal for the display of a moving sequence of images, the terminal comprising means for the interpolation of at least one interpolated image between a preceding image and a following image in the moving sequence, wherein said images comprise as least two objects wherein the means for interpolation comprises:

means for detecting, in said preceding image and/or in said following image, at least one zone, called an occlusion zone, corresponding to a zone where a first of said objects is at least partially overlapped by a second of said objects, and providing for a corresponding occlusion information defining said occlusion zone;

means for determining an approximate preceding image, respectively an approximate following image, in view of said occlusion information, by removing in said preceding image, respectively said following image, at least one region corresponding to one of said at least one occlusion zone; and means for applying motion estimation to the objects of said approximate preceding image and/or said approximate following image, to provide at least one intermediate image, wherein each of said images is associated to a mesh and wherein said motion estimation is applied to said mesh, said motion estimation comprising the steps of:

excluding, for each occlusion zone in said preceding image or said following image respectively, a region of said mesh encompassing at least one mesh point corresponding to said occlusion zone, called an encompassing region, so as to obtain an approximate preceding image, or an approximate following image respectively;

determining motion vectors, called forward motion vectors or backward motion vectors respectively, using forward estimation or backward estimation respectively, enabling determination of said approximate following image or preceding image respectively, from said approximate preceding image or following image respectively; and constructing an intermediate image from said approximate preceding image, or approximate following image respectively, and said forward motion vectors or backward motion vectors respectively.

* * * * *